US011817781B2

(12) United States Patent
Zhang et al.

(10) Patent No.: US 11,817,781 B2
(45) Date of Patent: Nov. 14, 2023

(54) POWER CONVERTER HAVING POWER STAGE CIRCUITS AND AN AUXILIARY MODULE

(71) Applicant: Silergy Semiconductor Technology (Hangzhou) LTD, Hangzhou (CN)

(72) Inventors: Wang Zhang, Hangzhou (CN); Chen Zhao, Hangzhou (CN)

(73) Assignee: Silergy Semiconductor Technology (Hangzhou) LTD, Hangzhou (CN)

(*) Notice: Subject to any disclaimer, the term of this patent is extended or adjusted under 35 U.S.C. 154(b) by 56 days.

(21) Appl. No.: 17/545,141

(22) Filed: Dec. 8, 2021

(65) Prior Publication Data

US 2022/0209664 A1 Jun. 30, 2022

(30) Foreign Application Priority Data

Dec. 25, 2020 (CN) ........................ 202011565342.X

(51) Int. Cl.
*H02M 3/156* (2006.01)
*H02M 3/335* (2006.01)

(52) U.S. Cl.
CPC ....... *H02M 3/156* (2013.01); *H02M 3/33507* (2013.01)

(58) Field of Classification Search
None
See application file for complete search history.

(56) References Cited

U.S. PATENT DOCUMENTS 8,581,518 B2 11/2013 Kuang et al.
10,033,276 B2 * 7/2018 Shenoy ............... H02M 3/1584
10,236,776 B2 * 3/2019 Yano ....................... H02M 1/08
10,879,801 B2 * 12/2020 Zhang ................... H02M 3/158
11,197,374 B2 * 12/2021 Sturcken ............ H02M 3/1584
2011/0127925 A1 6/2011 Huang et al.
2016/0056709 A1 * 2/2016 Khayat .................. H02M 1/34 323/223
2017/0318639 A1 11/2017 Wang et al.
2018/0295685 A1 10/2018 Wang et al.
2018/0295690 A1 10/2018 Chen et al.
2018/0310376 A1 10/2018 Huang et al.

FOREIGN PATENT DOCUMENTS

CN 107346940 A 11/2017

* cited by examiner

*Primary Examiner* — Jeffrey A Gblende

(57) ABSTRACT

A power converter can include at least one first power stage circuit and a second power stage circuit, where each of the at least one first power stage circuit can include: at least one power switch, configured as a main power switch; a first magnetic element; a first energy storage element configured to be coupled to a first node of the first power stage circuit together with one adjacent power stage circuit, and to be charged or discharged through the adjacent power stage circuit; and an auxiliary module configured to ensure that a current flowing through the first magnetic element is not less than zero in a current discontinuous mode, where a first terminal of the second power stage circuit is coupled to an adjacent first power stage circuit.

20 Claims, 9 Drawing Sheets

POWER CONVERTER HAVING POWER STAGE CIRCUITS AND AN AUXILIARY MODULE

RELATED APPLICATIONS

This application claims the benefit of Chinese Patent Application No. 202011565342.X, filed on Dec. 25, 2020, which is incorporated herein by reference in its entirety.

FIELD OF THE INVENTION

The present invention generally relates to the field of power electronics, and more particularly to power converters.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
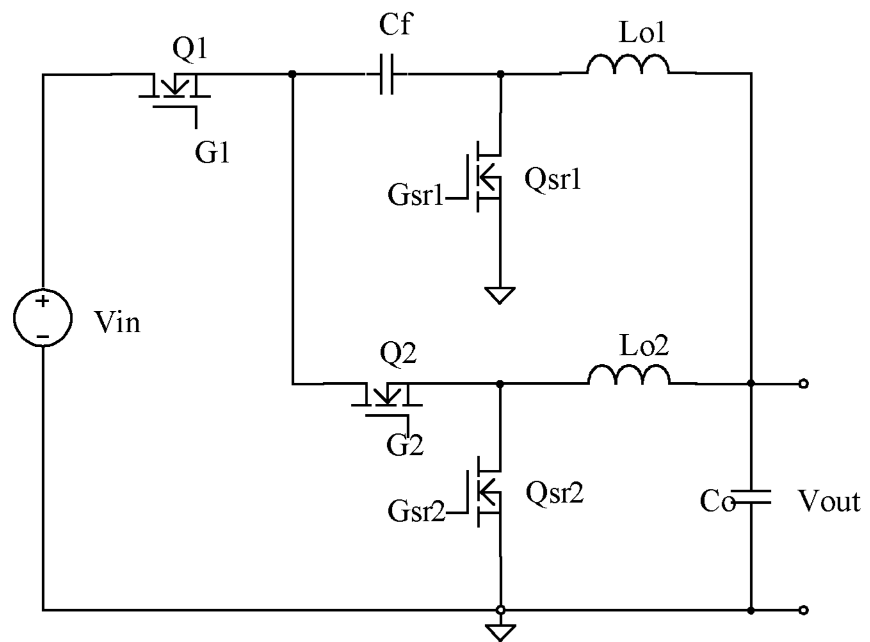
FIG. 1 is a schematic diagram of an example power converter with a high power conversion ratio.

With continuous development of power electronics technology, high-gain power converters have become an indispensable part of energy utilization. Referring now to FIG. 1, shown is a schematic diagram of an example power converter with a high voltage conversion ratio. In this example, the power converter can include a first power stage circuit and a second power stage circuit. The first power stage circuit can include main power switch Q1, capacitor Cf, rectifier switch Qsr1, and inductor Lo1. The second power stage circuit can include a buck circuit formed by main power switch Q2, rectifier switch Qsr2, and inductor Lo2. An input terminal of the second power stage circuit can connect to the common node of main power switch Q1 and capacitor Cf. Here, rectifier switch Qsr1 can be turned on when main power switch Q1 is turned off to provide a freewheeling loop of inductor Lo1, and may also be turned on during the turn-on period of main power switch Q2 to provide a discharge loop for capacitor Cf. Capacitor Cf can be taken as an input source to provide energy for the second power stage circuit.

Figure 2:
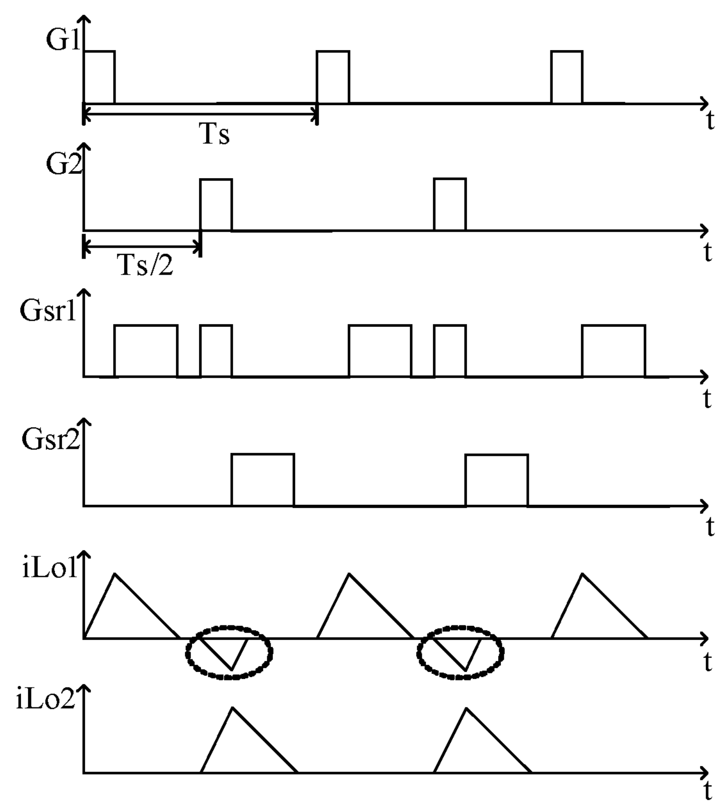
FIG. 2 is a waveform diagram of example operation of the power converter with the high power converter ratio under a current discontinuous mode.

Referring now to FIG. 2, shown is a waveform diagram of example operation of the power converter with the high voltage conversion ratio under a current discontinuous mode. As described above, since rectifier switch Qsr1 can be turned on when main power switch Q2 is turned on, inductor current iLo1 may be negative, as shown by the dotted line in FIG. 2. This negative current reduces the efficiency of the converter. In addition, the negative current can cause the voltage across capacitor Cf to deviate from ½ Vin, which may result in imbalance of the two inductor currents, and is not conducive to reliable converter operation. In addition, when rectifier switches Qsr1 and Qsr2 are replaced with rectifier diodes, there may also be negative currents, or the circuit may not operate normally in the discontinuous mode.

Figure 3:
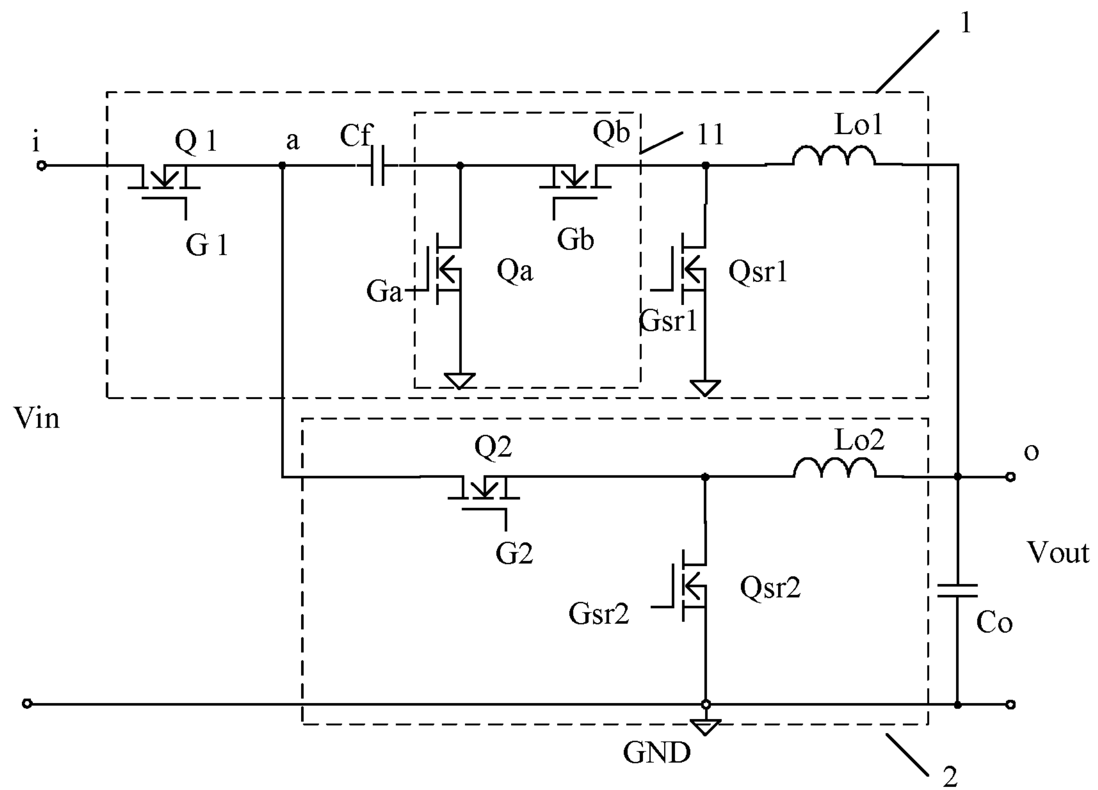
FIG. 3 is a schematic diagram of a first example power converter, in accordance with embodiments of the present invention.

Referring now to FIG. 3, shown is a schematic diagram of a first example power converter, in accordance with embodiments of the present invention. In this particular example, the power converter can include power stage circuits 1 and 2, where a "first" terminal of power stage circuit 2 is coupled to the adjacent power stage circuit 1. For example, the first terminal of power stage circuit 2 can connect to node "a" of power stage circuit 1, and "second" terminals of both power stage circuits 1 and 2 can connect together. For example, a first terminal of the power converter can be an input terminal, and a second terminal can be an output terminal. For example, the first terminal of power stage circuit 1 can be terminal "i" of the power converter, which can be used as the input terminal to receive input voltage Vin. The second terminals of power stage circuits 1 and 2 can connect together as terminal "o" of the power converter, which may be the output terminal of the power converter to generate output voltage Vout.

Power stage circuit 1 can include power switch Q1 (e.g., the main power switch of power stage circuit 1), which can connect between terminal i and node a. An energy storage element (e.g., capacitor Cf) can be coupled with auxiliary module 11 and the adjacent power stage circuit (e.g., power stage circuit 2) at node a, and can be discharged through power stage circuit 2. The current flowing through a magnetic element in power stage circuit 1 may not be less than zero in the current discontinuous mode. For example, the magnetic element is inductor Lo1, which can be coupled between auxiliary module 11 and output terminal o of power stage circuit 1.

For example, auxiliary module 11 in power stage circuit 1 can connect between a terminal of capacitor Cf and a first terminal of inductor Lo1. In this example, auxiliary module 11 may provide a conduction path for the current of inductor Lo1 to flow to output terminal o in a first operation stage, and to provide a discharge path for capacitor Cf in a second operation stage to prevent the current of inductor Lo1 from being reversed. In this example, auxiliary module 11 can include power switch Qa connected between the terminal of capacitor Cf and a reference ground, and power switch Qb connected between the terminal of capacitor Cf and the first terminal of inductor Lo1. It should be understood that in the first operation stage, input voltage Vin may provide energy for capacitor Cf and inductor Lo1 through power switch Qb. In the second operation stage, capacitor Cf can discharge through power stage circuit 2 and power switch Qa to the output terminal.

In addition, power stage circuit 1 can also include power switch Qsr1 as the rectifier switch, which can connect between the first terminal of inductor Lo1 and the reference ground, in order to provide a freewheeling loop for power stage circuit 1. In this example, the existence of power switch Qa may provide a discharge path for capacitor Cf, such that there is no need to discharge through rectifier switch Qsr1. Power stage circuit 2 can include a switching power stage circuit (e.g., a buck circuit). For example, power stage circuit 2 can include power switch Q2 as the main power switch that can connect in series between the first terminal of power stage circuit 2 and the reference ground, power switch Qsr2 as the rectifier switch, and a second magnetic element (e.g., inductor Lo2) that can connect between the common node of main power switch Q2 and rectifier switch Qsr2 and output terminal o. In some examples, the magnetic elements may be coupled to each other.

It should be understood that since terminal i of the power converter is the input terminal and terminal o is the output terminal, capacitor Cf can store energy during the period when power switch Qb is turned on (e.g., the first operation stage), and may be used as the input source of power stage circuit 2 to release energy to output terminal o via power stage circuit 2 and power switch Qa during the period when power switch Qa is turned on (e.g., the second operation stage). In principle, power switch Qa can replace part of the function of rectifier switch Qsr1 in FIG. 1, such the maximum on-time of power switch Qa is the off-time of main power switch Q1 connected to the first terminal of power stage circuit 1. That is, power switch Qa and main power switch Q1 can be turned on and off in a complementary way. In addition, the maximum on-time of power switch Qb can be the off-time of power switch Qa. That is, power switch Qb and power switch Qa may be turned on and off in a complementary way.

For example, the conduction interval of power switch Qa may at least overlap with the conduction interval of main power switch Q2 connected to the first terminal of the next adjacent power stage circuit (e.g., power stage circuit 2). That is, when main power switch Q2 is in the conduction state, power switch Qa may also be in the conduction state, and the on-time of power switch Qa can be greater than or equal to the on-time of main power switch Q2. The conduction interval of power switch Qb may at least overlap the conduction interval of main power switch Q1 connected to the first terminal of the current power stage circuit (e.g., power stage circuit 1). That is, when main power switch Q1 is in the conduction state, power switch Qb may also be in the conduction state, and the on-time of power switch Qb can be greater than or equal to the on-time of main power switch Q1.

When the duty cycle is less than 0.5, the on-time of power switch Qa can be less than its maximum on-time. In some embodiments, the switching state of power switch Qa may be the same as the switching state of power switch Q2. Thus, a path may be provided for the discharge of capacitor Cf through power stage circuit 2, in order to prevent the inductor current from being reversed when power switch Q2 is turned on. Also, the on-time of power switch Qb may also be less than its maximum on-time. In some embodiments, the switching state of power switch Qb can be the same as the switching state of power switch Q1. Thus, a path may be provided for input voltage Vin, in order to provide energy for capacitor Cf and inductor Lo1 when power switch Q1 is turned on, and the current of inductor Lo1 can flow to output terminal o of the power converter through auxiliary module 11. It should be understood that the above-mentioned example is the minimum on-time of power transistors Qa and Qb, and other switching states between the minimum on-time and the maximum on-time can also be supported in certain embodiments.

Figure 4:
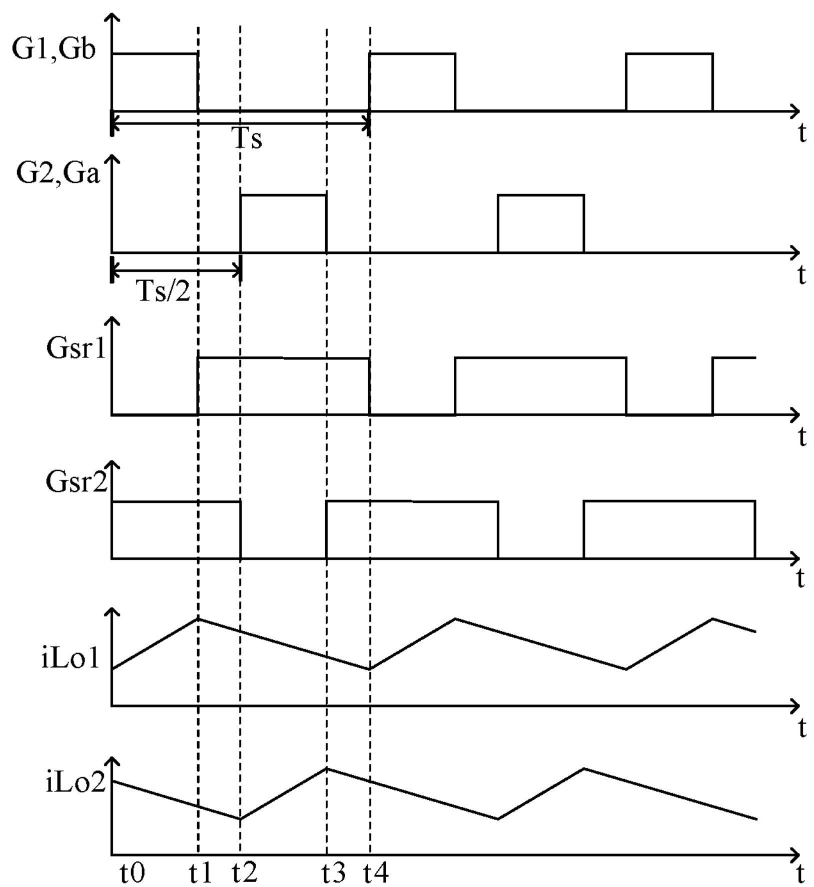
FIG. 4 is a waveform diagram of first example operation of the first example power converter, in accordance with embodiments of the present invention.
Figure 5:
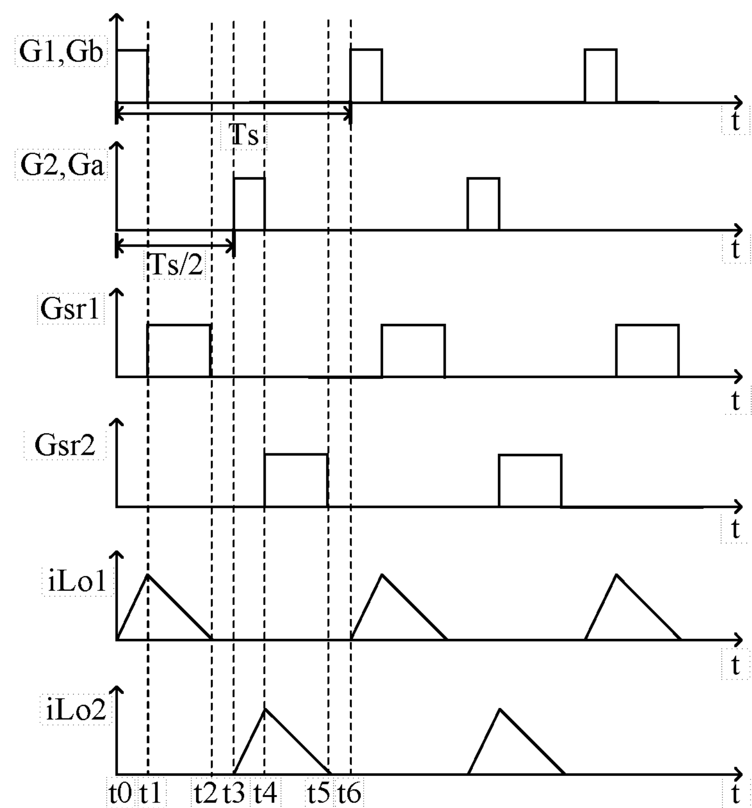
FIG. 5 is a waveform diagram of second example operation of the first example power converter, in accordance with embodiments of the present invention.

Referring now to FIG. 4, shown is a waveform diagram of first example operation of the first example power converter, in accordance with embodiments of the present invention. Here, FIG. 4 illustrates the waveforms for driving signals and the inductor current in the current continuous mode. Referring also to FIG. 5, shown is a waveform diagram of second example operation of the first example power converter, in accordance with embodiments of the present invention. Here, FIG. 5 illustrates the waveforms for driving signals and the inductor current in the current discontinuous mode. For example, the duty cycle is less than 0.5. From FIGS. 4 and 5, driving signal G1 for main power switch Q1 in power stage circuit 1 can be the same as driving signal Gb for power switch Qb. Driving signal G2 for main power switch Q2 in power stage circuit 2 can be the same as driving signal Ga for power switch Qa in power stage circuit 1.

Under the current continuous mode, driving signal Gsr1 for rectifier switch Qsr1 in power stage circuit 1 may be complementary to driving signal G1 for main power switch Q1, and driving signal Gsr2 for rectifier switch Qsr2 in power stage circuit 2 may be complementary to driving signal G2 for main power switch Q2. Under the current discontinuous mode, rectifier switch Qsr1 in power stage circuit 1 can be turned on when main power switch Q1 is turned off, and may be turned off when inductor current iLo1 flowing through inductor Lo1 crosses zero. In addition, rectifier switch Qsr2 in power stage circuit 2 can be turned on when main power switch Q2 is turned off, and may be turned off when inductor current iLo2 flowing through inductor Lo2 crosses zero. In addition, rectifier switches Qsr1 and Qsr2 can be synchronous rectifier power switches, but those skilled in the art will recognize that rectifier switches Qsr1 and Qsr2 can be replaced with rectifier diodes without affecting the operation of the power converter.

In particular embodiments, the conduction time of main power switch Q1 in power stage circuit 1 and main power switch Q2 in power stage circuit 2 may be the same, and there can be a certain phase difference between the turn-on moments of the two power switches. For example, the phase difference is 180° (e.g., the time difference Ts/2 in the drawings). The control circuit for the power converter can adjust output voltage Vout by changing duty cycle D of the main power switches in power stage circuits 1 and 2, in order to generate the desired output voltage. It should be understood that there are many control methods for adjusting the output voltage by changing the duty cycle. For example, the control circuit can adjust output voltage Vout by adjusting the on-time of the main power switches in the first and second power stage circuits at a fixed switching frequency. Also, the control circuit can keep the on-time of the power switch in each power stage circuit unchanged, and may adjust output voltage Vout by adjusting the switching frequency of the power switches. In addition, other control methods for controlling the power converter can also be supported in certain embodiments.

The operation principle of the first example power converter will be described in detail below. In one example, the power converter may operate in current continuous mode and the duty cycle is less than 0.5, as shown in FIG. 4. During time period t0-t1, main power switch Q1 and power switch Qb can be turned on, and input voltage Vin may provide energy for capacitor Cf and inductor Lo1 and provides energy to output terminal o, such that inductor current iLo1 increases. In addition, rectifier switch Gsr2 can be turned on, such that inductor current iLo2 flows through rectifier switch Qsr2 for freewheeling and decreases. During time period t1-t2, main power switch Q1 and power switch Qb may be turned off, rectifier switch Gsr1 can be turned on, rectifier switch Gsr2 may remain on, and inductor currents iLo1 and iLo2 may both decrease.

During time period t2-t3, main power switch Q2 and power switch Qa can be turned on, rectifier switch Gsr1 may remain on, and rectifier switch Gsr2 can be turned off. Thus capacitor Cf can be discharged through power stage circuit 2 and power switch Qa to provide energy to output terminal o, and voltage Vcf across capacitor Cf may be used as the input source of power stage circuit 2, such that inductor current iLo2 flowing through inductor Lo2 can increase. In addition, inductor current iLo1 may continue to flow through rectifier switch Qsr1 for freewheeling and decrease. During time period t3-t4, rectifier switch Gsr1 may remain on, rectifier switch Gsr2 may remain on, and inductor currents iLo1 and iLo2 may both decrease. Since the two power stage circuits are interleaved to be turned on and off, the current ripple at the output terminal can be reduced. In this example, Vo/Vin=D/2, so a higher voltage conversion ratio can be achieved.

In another example, the power converter can operate in the current discontinuous mode, as shown in FIG. 5. During time period t0-t1, main power switch Q1 and power switch Qb can be turned on, and thus input voltage Vin may provide energy for capacitor Cf and inductor Lo1, and may also provide energy to output terminal o, such that inductor current iLo1 flowing through inductor Lo1 increases. After time t1, main power switch Q1 and power switch Qb can be turned off, rectifier switch Qsr1 may be turned on, and then inductor current iLo1 may flow through rectifier switch Qsr1 for freewheeling and decreases. At time t2, inductor current iLo1 may decrease to zero, and rectifier switch Qsr1 can be turned off. During time period t2-t3, the power devices in the circuit may all be turned off, and no current may flow in the circuit. During time period t3-t4, main power switch Q2 and power switch Qa can be turned on, and voltage Vcf across capacitor Cf may be used as the input source of power stage circuit 2 and can provide energy to output terminal o through power stage circuit 2 and power switch Qa, such that inductor current iLo2 flowing through inductor Lo2 increases. After time t4, main power switch Q2 can be turned off, rectifier switch Qsr2 may be turned on, and inductor current iLo2 can flow through rectifier switch Qsr2 for freewheeling and decreases. At time t5, inductor current iLo2 can decrease to zero, and then rectifier switch Qsr2 may be turned off. During time period t5-t6, the power devices in the circuit may all be turned off.

It can be seen from FIG. 5 that when rectifier switches Qsr1 and Qsr2 are turned off after the inductor current reaches zero in the respective power stage circuit, power switch Qa in the auxiliary module may form an additional discharge path for capacitor Cf replacing the freewheeling function of rectifier switch Qsr1, such that rectifier switch Qsr1 may not need to be turned on again here. Therefore, there may be no negative current in power stage circuit 1, thereby ensuring the efficiency of the power converter. In addition, voltage Vcf across capacitor Cf can equal ½ Vin due to the symmetry of the two inductor currents, which may avoid the voltage offset of capacitor Cf and ensure the reliability of the power converter.

Figure 6:
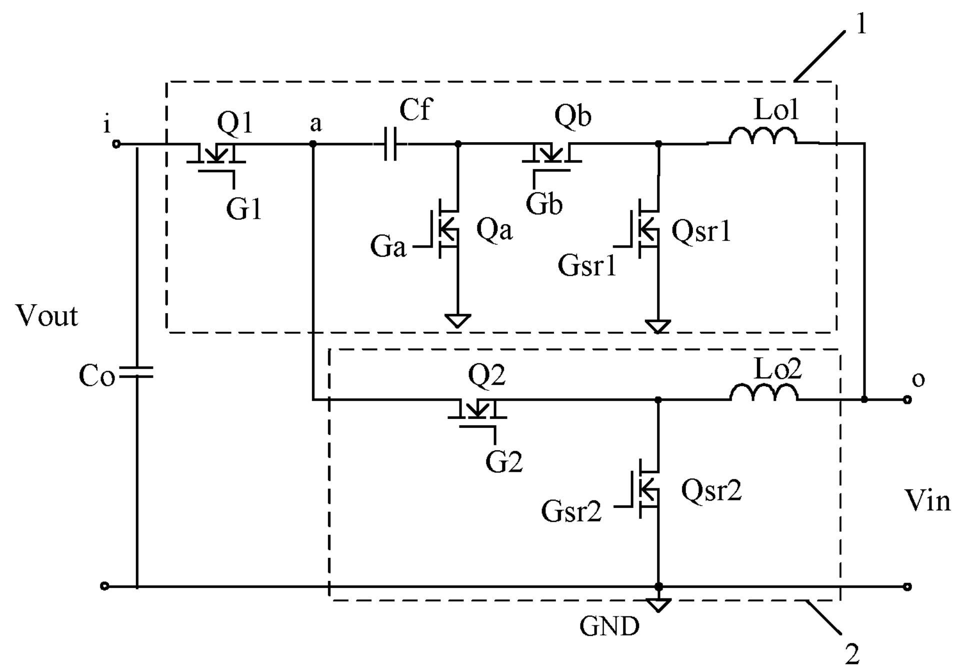
FIG. 6 is a schematic diagram of a second example power converter, in accordance with embodiments of the present invention.

Referring now to FIG. 6, shown is a schematic diagram of a second example power converter, in accordance with embodiments of the present invention. In this example, the structure of the power converter is the same as the first example power converter, and the difference is that "i" is the output terminal and "o" is the input terminal, the second terminals of both power stage circuits 1 and 2 can connect together as input terminal o of the power converter to receive input voltage Vin, and the first terminal of power stage circuit 1 may be used as output terminal i of the power converter to generate output voltage Vout.

In this example, power stage circuit 2 is a boost circuit. Power switches Qsr1 and Qsr2 can be used as the main power switches, and may alternately turned on with the same conduction time. Power switches Q1 and Q2 can be used as rectifier switches. When the power converter operates in the current continuous mode, rectifier switch Q1 and main power switch Qsr1 can be turned on complementarily. Also, rectifier switch Q2 and main power switch Qsr2 are turned on complementarily. When the power converter operates in the current discontinuous mode, rectifier switch Q1 can be turned on when main power switch Qsr1 is turned off, and rectifier switch Q1 can be turned off when inductor current iLo1 reaches zero. Also, rectifier switch Q2 can be turned on when main power switch Qsr2 is turned off, and rectifier switch Q2 may be turned off when inductor current iLo2 reaches zero. While in this example, the rectifier switch includes a synchronous rectifier power switch, a rectifier diode can also be used in certain embodiments.

The driving signals for power switches Qa and Qb can be the same as those in the first example. The maximum on-time of power switch Qa may be the off-time of rectifier switch Q1 connected to the first terminal of the current power stage circuit. The maximum on-time of power switch Qb can be the off-time of power switch Qa. For example, it may only be necessary to ensure that power switch Qa is also in the conduction state during the conduction period of rectifier switch Q2 connected to the first terminal of the next adjacent power stage circuit, and power switch Qb is also in the conduction state during the conducting period of rectifier switch Q1 connected to the first terminal of the current power stage circuit. That is, the on-time of power switch Qa can be within the on-time of rectifier switch Q2, and the on-time of power switch Qb may be within the on-time of rectifier switch Q1.

In addition, capacitor Cf can be charged through power stage circuit 2 during the period when power switch Qa is turned on (e.g., the second operation stage). That is, power switch Qa may provide a charging path for capacitor Cf at this time, and the voltage across capacitor Cf can be the output voltage of power stage circuit 2. In addition, capacitor Cf may be discharged during the turn-on period of power switch Qb (e.g., the first operation stage), and can supply power to the output terminal together with input voltage Vin, such that the inductor current of inductor Lo1 flows to output terminal i of the power converter through the auxiliary module.

Figure 7:
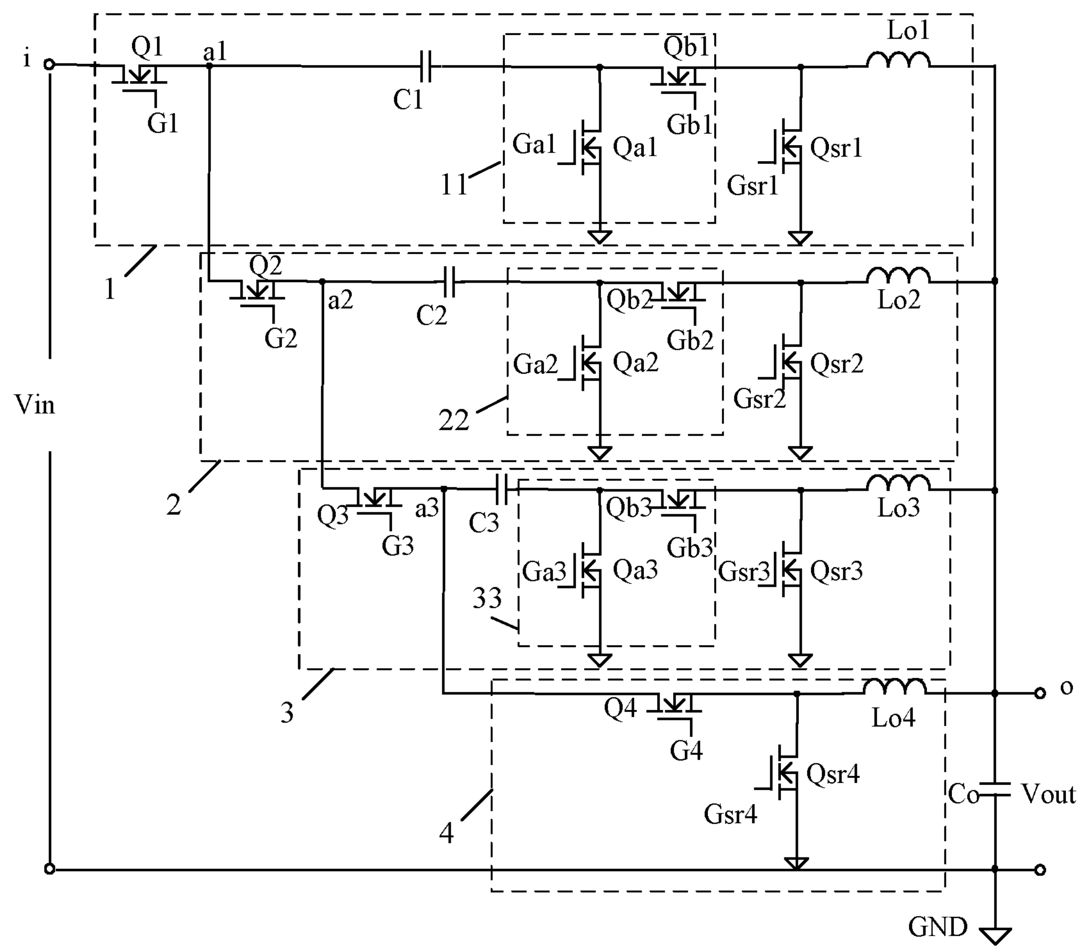
FIG. 7 is a schematic diagram of a third example power converter, in accordance with embodiments of the present invention.

Referring now to FIG. 7, shown is a schematic diagram of a third example power converter, in accordance with embodiments of the present invention. In this example, the power converter can include "first" power stage circuits 1-3 and "second" power stage circuit 4, and any number of such "first" power stages can be supported in particular. In this example, the first terminal of power stage circuit 1 can connect to terminal i of the power converter, and the first terminal of each other power stage circuit may respectively be coupled to the first node of the previous adjacent power stage. For example, the first terminal of power stage circuit 2 can connect to node a1 of the power stage circuit 1, the first terminal of the power stage circuit 3 can connect to node a2 of power stage circuit 2, and the first terminal of power stage circuit 4 can connect to the first node of the adjacent "first" power stage circuit (the last "first" power stage circuit), which in this case is node a3 of power stage circuit 3. The second terminals of each of the first and second power stage circuits can connect together at terminal o of the power converter. Here, terminal i of the power converter can be used as the input terminal to receive input voltage Vin, and terminal o may be the output terminal to generate output voltage Vout. It should be understood that the case where terminal i is the output terminal and terminal o is the input terminal may also be supported in certain embodiments.

For example, power stage circuit 1 can include power switch Q1 as the main power switch, which can connect between terminal i and node a1, and an energy storage element (e.g., capacitor C1) that can be coupled with an adjacent power stage circuit (e.g., power stage circuit 2) at node a1, and can be discharged through the adjacent power stage circuit. Power stage circuit 1 can also include auxiliary module 11. The current flowing through a magnetic element in power stage circuit 1 may not be less than zero in the current discontinuous mode. The "first" magnetic element here is inductor Lo1, which can be coupled between auxiliary module 11 and terminal o of power stage circuit 1. It should be understood that when terminal i is the output terminal and terminal o is the input terminal, capacitor C1 may be charged via the adjacent power stage circuit.

For example, auxiliary module 11 in power stage circuit 1 can connect between the terminal of capacitor C1 and the first terminal of inductor Lo1. Auxiliary module 11 may allow input voltage Vin to provide energy for inductor Lo1 in the first operation stage, such that the inductor current can flow to output terminal o through auxiliary module 11, and auxiliary module 11 may provide a discharge path for capacitor C1 in the second operation stage, in order to prevent the inductor current of inductor Lo1 from flowing in a reverse direction. In this example, auxiliary module 11 can include power switch Qa1 connected between the terminal of capacitor C1 and the reference ground, and power switch Qb1 connected between the terminal of capacitor C1 and the first terminal of inductor Lo1. In addition, power stage circuit 1 can also include power switch Qsr1 (e.g., a rectifier switch), which can connect between the first terminal of inductor Lo1 and the reference ground, in order to provide a freewheeling loop for power stage circuit 1.

The "first" power stage circuit j (where j=2, 3) can include power switch Qj as the main power switch of first power stage circuit j, which can connect to the first terminal of the current first power stage circuit j; that is, first node a(j−1) of the last adjacent power stage circuit (j−1), and "first" node aj of the current first power stage circuit j. First power stage circuit j (where j=2, 3) can also include a "first" energy storage element (e.g., capacitor Cj) that can be coupled to first node aj with the next adjacent power stage circuit (j+1), and may be discharged through the adjacent power stage circuit (j+1). Further, first power stage circuit j (where j=2, 3) can include auxiliary module jj, in order to ensure that the current flowing through the first magnetic element in the first power stage circuit j is not less than zero in the current discontinuous mode. The first magnetic element here is inductor Loj, which can be coupled between auxiliary module jj and terminal o. It should be understood that when terminal i is the output terminal and terminal o is the input terminal, capacitor Cj may be charged via the adjacent power stage circuit.

For example, auxiliary module jj in first power stage circuit j can connect between the terminal of capacitor Cj and the first terminal of inductor Loj. Also, auxiliary module jj can allow input voltage Vin to provide energy for capacitor Cf and inductor Lo1 in the first operation stage, and the inductor current of inductor Loj flows to output terminal o through auxiliary module jj. Further, auxiliary module jj may also provide a discharge path for capacitor Cj in the second operation stage to prevent the inductor current of inductor Loj from flowing in a reverse direction. In this example, auxiliary module jj can include power switch Qaj connected between the terminal of capacitor Cj and the reference ground, and power switch Qbj connected between the terminal of capacitor Cj and the first terminal of inductor Loj. In addition, first power stage circuit j can also include power switch Qsrj as a rectifier switch, which can connect between the first terminal of inductor Loj and the reference ground, in order to provide a freewheeling loop for first power stage circuit j. In this example, "second" power stage circuit 4 can include power switch Q4 (e.g., as a main power switch) and power switch Qsr4 (e.g., as a rectifier switch) connected in series between the first terminal of second power stage circuit 4 and the reference ground, and a second magnetic element (e.g., inductor Lo4). In some embodiments, the magnetic elements may be coupled to each other.

Figure 8:
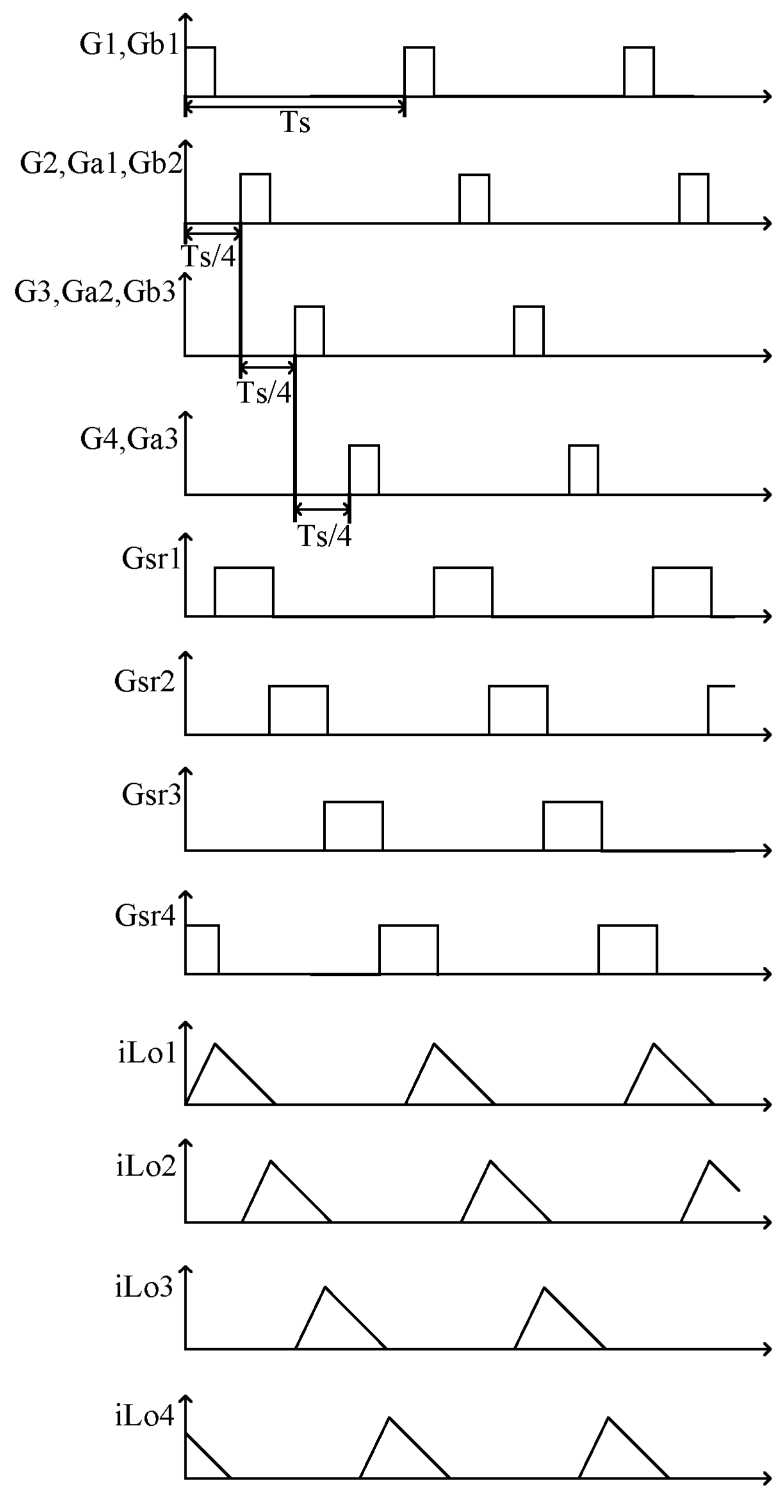
FIG. 8 is a waveform diagram of first example operation of the third example power converter, in accordance with embodiments of the present invention.

Referring now to FIG. 8, shown is a waveform diagram of first example operation of the third example power converter, in accordance with embodiments of the present invention. Here, the power converter operating under the current discontinuous mode with the duty cycle less than 0.5 is taken as an example for description. For other cases, reference may be made to the power converter of the first example above. It can be seen that driving signal Gbm for power switch Qbm in "first" power stage circuit m (m=1, 2, 3) can be the same as driving signal Gm for power switch Qm connected to the first terminal of the current power stage circuit m, and driving signal Gam for power switch Qam may be the same as driving signal Gm+1 of power switch Qm+1 connected to the first terminal of the next adjacent power stage circuit (m+1). When main power switch Qm in power stage circuit m is turned on, since power switch Qbm is also turned on, capacitor Cm can be charged, and the current flowing through inductor Lom may flow to output terminal o through auxiliary module 11 and increase. Further, capacitor Cm can be discharged when power switch Q(m+1) in the next adjacent power stage circuit (m+1) and power switch Qam are turned on.

In the current continuous mode, driving signal Gsrm for rectifier switch Qsrm in first power stage circuit m may be complementary to driving signal Gm for main power switch Qm, and driving signal Gsr4 for rectifier switch Qsr4 can be complementary to driving signal G4 for main power switch Q4 in the second power stage circuit 4. In the current discontinuous mode, rectifier switch Qsrm in first power stage circuit m can be turned on when main power switch Qm is turned off, and may be turned off when current iLom flowing through inductor Lom reaches zero. Similarly, rectifier switch Qsr4 in second power stage circuit 4 can be turned on when main power switch Q4 is turned off, and may be turned off when current iLo4 flowing through inductor Lo4 reaches zero.

In particular embodiments, rectifier switches Qsrm and Qsr4 may both be synchronous rectifier power switches. Those skilled in the art will recognize that rectifier switches Qsrm and Qsr4 can be replaced with rectifier diodes without affecting the operation of the converter. In addition, the conduction time of main power switch Qm in the first power stage circuit m and the conduction time of main power switch Q4 in second power stage circuit 4 can be the same, and there may be a phase difference between the turn-on moments of each power switch. For example, the phase difference is 360°/(m+1) (e.g., 90° in this example, time difference Ts/4 in FIG. 8). As a result, the inductor currents of all power stage circuits can be interleaved, thereby reducing the current ripple. Also, the inductor currents in the power stage circuits may not be less than zero in the current discontinuous mode, thereby ensuring the reliability of the power converter.

In addition, the control circuit in the power converter can adjust output voltage Vout by adjusting duty cycle D of the main power switches in the first and second power stage circuits, in order to generate the desired output voltage. It should be understood that the control circuit can adjust output voltage Vout by adjusting the on-time of the main power switches in the first and second power stage circuits at a fixed switching frequency. Also, the control circuit can keep the on-time of the main power switches in each power stage circuit unchanged, and may adjust output voltage Vout by adjusting the switching frequency of the power switches. In addition, other control methods for controlling the power converter can also be applied in certain embodiments.

Figure 9:
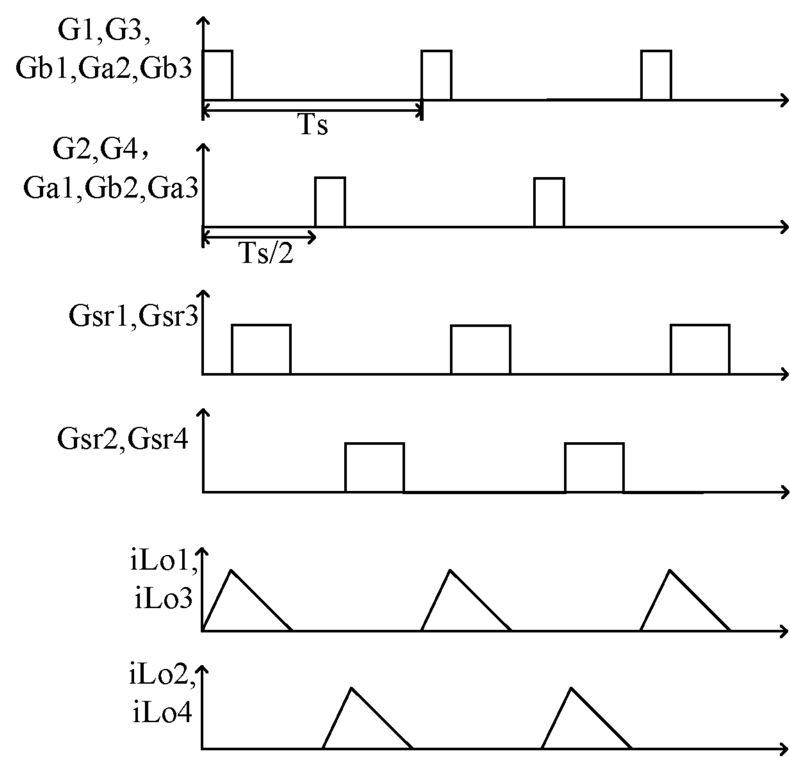
FIG. 9 is a waveform diagram of second example operation of the third example power converter, in accordance with embodiments of the present invention.

Referring to FIG. 9, shown is a waveform diagram of second example operation of the third example power converter, in accordance with embodiments of the present invention. This control method can also be used in certain embodiments, in addition to the above-mentioned phase shifting control method. When the total number of the first and second power stage circuits is N, including N−1 first power stage circuits and one second power stage circuit, the driving signals of the main power switches in the (2j−1)th power stage circuit (e.g., the ordinal number is odd) can be the same (e.g., denoted as the first driving signal), and the driving signals for the main power switches in the 2jth power stage circuit can be the same (e.g., denoted as the second driving signal), and there may be a phase difference of 180° between the first and second driving signals, where j and N are both positive integers, and $N \geq 2$, $j \leq (N+1)/2$.

As shown, N is 4 as an example for description. In this example, the driving signal for the main power switch in the first power stage circuit (e.g., driving signal G1 for power switch Q1) and the driving signal for the main power switch in the third power stage circuit (e.g., driving signal G3 for power switch Q3) can be the same. Also, the driving signal for the main power switch in the second power stage circuit (e.g., driving signal G2 for power switch Q2) and the driving signal for the main power switch in the fourth power stage circuit (e.g., driving signal G4 for power switch Q4) can be the same, and there may be a phase difference of 180° (e.g., time difference Ts/2) between driving signal G1 and driving signal G2. In addition, driving signal Gbm for power switch Qbm in first power stage circuit m (m=1, 2, 3) can be the same as driving signal Gm for power switch Qm connected to the first terminal of the current power stage circuit m. Driving signal Gam for power switch Qam may be the same as driving signal Gm+1 for power switch Qm+1 connected to the first terminal of the next adjacent power stage circuit (m+1). The switching states of the first and second power switches may remain the same as those in the above-mentioned first example, and can be extended to the power converter including N power stage circuits.

Under this control mode, the inductor currents in the odd-numbered power stage circuits can be the same, and the inductor currents in the even-numbered power stage circuits may be the same. As shown, currents iLo1 and iLo3 can be the same, and currents iLo2 and iLo4 may be the same, and they may have a phase difference of 180°. Similarly, under this control mode, the control circuit in the power converter can adjust output voltage Vout by adjusting duty cycle D of the main power switches in the first and second power stage circuits, in order to generate the desired output voltage. Similarly, particular embodiments may realize that the inductor current of each power stage circuit may not be less than zero under the current discontinuous mode, such that the power converter can operate normally under light load, and reliable operation of the power converter can be ensured.

As described above, it should be understood that when other power converters have the following architecture: the terminal is connected to an energy storage element through a power switch, the energy storage element is coupled to the first terminal of a magnetic element, and the first terminal of the magnetic element can connect to the reference ground through a power switch, the auxiliary module in particular embodiments can be added between the terminal of the energy storage element and the first terminal of the magnetic element, in order to avoid negative current in the current discontinuous mode.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A power converter, having at least one first power stage circuit and a second power stage circuit, wherein each of the at least one first power stage circuit comprises:

a) at least one power switch, configured as a main power switch;

b) a first magnetic element;

c) a first energy storage element configured to be coupled to a first node of the first power stage circuit together with one adjacent power stage circuit, and to be charged or discharged through the adjacent power stage circuit;

d) an auxiliary module configured to ensure that a current flowing through the first magnetic element is not less than zero in a current discontinuous mode, wherein the auxiliary module is directly connected between a first terminal of the first energy storage element and a first terminal of the first magnetic element; and e) wherein a first terminal of the second power stage circuit is coupled to an adjacent first power stage circuit.

2. The power converter of claim 1, wherein the first magnetic element is coupled between the auxiliary module and a terminal of the first power stage circuit.

3. The power converter of claim 1, wherein the auxiliary module is configured to allow the current flowing through the first magnetic element to flow to an output terminal of the power converter through the auxiliary module in a first operation stage, and to provide a charging or discharging path for the first energy storage element in a second operation stage, in order to prevent the current flowing through the first magnetic element from flowing in a reverse direction.

4. The power converter of claim 1, wherein the auxiliary module comprises a first power switch connected to a second power switch.

5. The power converter of claim 1, wherein the auxiliary module comprises:

a) a first power switch connected between the first terminal of the first energy storage element and a reference ground, wherein a second terminal of the first energy storage element is connected to the first node; and b) a second power switch connected between the first terminal of the first energy storage element and the first terminal of the first magnetic element.

6. The power converter of claim 5, wherein:

a) a conduction interval of the first power switch in a current first power stage circuit at least overlaps with a conduction interval of a power switch connected to a first terminal of a next adjacent power stage circuit; and b) a conduction interval of the second power switch at least overlaps with a conduction interval of a power switch connected to a first terminal of the current power stage circuit.

7. The power converter of claim 6, wherein a maximum on-time of the first power switch is an off-time of the power switch connected to the first terminal of the current power stage circuit, and a maximum on-time of the second power switch is an off-time of the first power switch.

8. The power converter of claim 1, wherein each power stage circuit further comprises a rectifier device having a synchronous rectifier power switch or a rectifier diode.

9. The power converter of claim 8, wherein:

a) the main power switch in each of the first power stage circuits is connected between a first terminal of a current first power stage circuit and the first node; and b) the rectifier device in each of the first power stage circuits is connected between a first terminal of the first magnetic element and a reference ground.

10. The power converter of claim 9, wherein:

a) when the power converter is in a current continuous mode, the main power switch and the rectifier device in the at least one first power stage circuit are turned on complementarily; and b) when the power converter is in the current discontinuous mode, the rectifier device in the at least one first power stage circuit is turned on when the corresponding main power switch is turned off, and is turned off when the current flowing through the first magnetic element reaches zero.

11. The power converter of claim 1, wherein the second power stage circuit comprises a switching power stage circuit having a main power switch, a rectifier device, and a second magnetic element to form a buck or boost power stage circuit.

12. The power converter of claim 11, wherein a first terminal of a first power stage circuit is connected to a first terminal of the power converter, first terminals of other first power stage circuits are respectively connected to the first node of a previous adjacent first power stage circuit in turn, a first terminal of the second power stage circuit is coupled to the first node of the last first power stage circuit, and second terminals of the at least one first power stage circuit and the second power stage circuit are connected together.

13. The power converter of claim 1, wherein the main power switches in the at least one first power stage circuit and the second power stage circuit are turned on sequentially with a phase difference, and the phase difference is less than 360°/N, wherein N is the total number of the first and second power stage circuits.

14. The power converter of claim 1, wherein on-time of the main power switches in the at least one first power stage circuit and on-time of the main power switch in the second power stage circuit are the same, and an output voltage of the power converter is adjusted by adjusting duty cycles of the main power switches.

15. The power converter of claim 1, wherein a switching frequency of the power converter is constant, and an output voltage of the power converter is adjusted by adjusting on-time of the main power switches in the at least one first power stage circuit and the second power stage circuit.

16. The power converter of claim 1, wherein on-time of the main power switches in the at least one first power stage circuit and the second power stage circuit is constant, and the output voltage of the power converter is adjusted by adjusting a switching frequency of the power converter.

17. The power converter of claim 1, wherein at least one of:

a) a first terminal of a first power stage circuit is taken as an input terminal of the power converter to receive an input voltage, second terminals of the at least one first power stage circuit and the second power stage circuit are connected to be taken as an output terminal of the power converter to generate an output voltage; and b) the second terminals of the at least one first power stage circuit and the second power stage circuit are connected to be taken as the input terminal of the power converter, and the first terminal of the first power stage circuit is taken as the output terminal of the power converter.

18. The power converter of claim 11, wherein the first magnetic element of one first power stage circuit is coupled to the first magnetic element of another first power stage circuit or the second magnetic element.

19. A power converter having at least one first power stage circuit and a second power stage circuit, wherein each of the at least one first power stage circuit comprises:

a) at least one power switch, configured as a main power switch;

b) a first magnetic element;

c) a first energy storage element configured to be coupled to a first node of the first power stage circuit together with one adjacent power stage circuit, and to be charged or discharged through the adjacent power stage circuit;

d) an auxiliary module configured to ensure that a current flowing through the first magnetic element is not less than zero in a current discontinuous mode;

e) wherein a first terminal of the second power stage circuit is coupled to an adjacent first power stage circuit;

f) a rectifier device in each of the at least one first power stage circuits is connected between a first terminal of a current first power stage circuit and the first node; and g) the main power switch in each of the at least one first power stage circuits is connected between the first terminal of the first magnetic element and the reference ground.

20. A power converter having at least one first power stage circuit and a second power stage circuit, wherein each of the at least one first power stage circuit comprises:

a) at least one power switch, configured as a main power switch;

b) a first magnetic element;

c) a first energy storage element configured to be coupled to a first node of the first power stage circuit together with one adjacent power stage circuit, and to be charged or discharged through the adjacent power stage circuit;

d) an auxiliary module configured to ensure that a current flowing through the first magnetic element is not less than zero in a current discontinuous mode;

e) wherein a first terminal of the second power stage circuit is coupled to an adjacent first power stage circuit; and f) wherein when the power converter comprises (N−1) first power stage circuits and one second power stage circuit, driving signals for the main power switches in the (2j−1)th power stage circuits are the same as a first driving signal, and driving signals for the main power switches in the 2j-th power stage circuits are the same as a second driving signal, and a phase difference between the first and second driving signals is 180°, wherein j and N are positive integers, $N \geq 2$, $j \leq (N+1)/2$.

* * * * *